(12) United States Patent
Pleyers et al.

(10) Patent No.: US 10,494,537 B2
(45) Date of Patent: Dec. 3, 2019

(54) COATING ON A SUBSTRATE

(71) Applicants: Tim Peter Pleyers, Wurselen (DE);
Gerd Josef Pleyers, Wurselen (DE)

(72) Inventors: Tim Peter Pleyers, Wurselen (DE);
Gerd Josef Pleyers, Wurselen (DE)

( * ) Notice: Subject to any disclaimer, the term of this patent is extended or adjusted under 35 U.S.C. 154(b) by 71 days.

(21) Appl. No.: 15/297,521

(22) Filed: Oct. 19, 2016

(65) Prior Publication Data
US 2018/0105716 A1    Apr. 19, 2018

(51) Int. Cl.
| | |
|---|---|
| *C04B 41/00* | (2006.01) |
| *C04B 41/52* | (2006.01) |
| *C04B 41/71* | (2006.01) |
| *C09D 133/00* | (2006.01) |
| *C09D 175/04* | (2006.01) |
| *C09D 5/00* | (2006.01) |
| *C09D 7/40* | (2018.01) |

(52) U.S. Cl.
CPC .......... *C09D 133/00* (2013.01); *C04B 41/009* (2013.01); *C04B 41/52* (2013.01); *C04B 41/71* (2013.01); *C09D 5/00* (2013.01); *C09D 7/70* (2018.01); *C09D 175/04* (2013.01)

(58) Field of Classification Search
CPC ...... C09D 133/00; C09D 7/70; C09D 7/1291; C09D 175/04; C04B 41/52; C04B 41/4884; C04B 41/009; C04B 41/483
See application file for complete search history.

(56) References Cited

U.S. PATENT DOCUMENTS

| | | | | |
|---|---|---|---|---|
| 4,288,959 A | * | 9/1981 | Murdock ............... | E04D 1/265 52/518 |
| 4,434,010 A | * | 2/1984 | Ash ...................... | B05D 1/286 106/415 |
| 5,942,072 A | * | 8/1999 | McKinnon .............. | B05D 1/32 156/247 |
| 6,572,927 B1 | | 6/2003 | Pleyers et al. | |

(Continued)

FOREIGN PATENT DOCUMENTS

DE    19828714 A1    12/1999

OTHER PUBLICATIONS

Author Unknown, 2011, Torginal ColorFlakes Product Data Sheet.*
https://encorecoatings.com/product/new-cool-pool-deck-coating/.
http://mortex.com/pdf/KoolDeck-Consumer.pdf.

*Primary Examiner* — Nathan L Van Sell
(74) *Attorney, Agent, or Firm* — The Webb Law Firm

(57) ABSTRACT

The present invention relates to a coating on a substrate. It is an object of the present invention to provide an improved coating on a substrate, which coating is to reduce the temperature felt by a person walking on the substrate as well as the actual temperature on the surface. The present invention provides a coating on a substrate that includes an impregnation material, respectively base material, which is adhered on the substrate, a particulate material adhered on the impregnation material, respectively base material, and optionally, a top coat covering an upper surface of the coating, in which the particulate material consists of crushed acrylic paint and/or wherein the particulate material is a platelet-shaped particulate material, and/or wherein the particulate material has an angular or very-angular shape such that the upper surface of the coating has a roughness of between 0.5 mm and 3 mm.

34 Claims, 3 Drawing Sheets

(56) References Cited

U.S. PATENT DOCUMENTS

| | | | |
|---|---|---|---|
| 8,431,054 B2* | 4/2013 | Pervan | B32B 21/02 |
| | | | 264/109 |
| 2004/0161546 A1* | 8/2004 | Clemmer | B32B 27/14 |
| | | | 427/407.1 |
| 2009/0148683 A1* | 6/2009 | Ilfrey | B05D 3/104 |
| | | | 428/215 |
| 2010/0104809 A1 | 4/2010 | Duda et al. | |
| 2014/0141239 A1* | 5/2014 | Ilfrey | B05D 5/02 |
| | | | 428/339 |
| 2016/0167086 A9* | 6/2016 | Ilfrey | B05D 5/02 |
| | | | 428/339 |

* cited by examiner

COATING ON A SUBSTRATE

FIELD

The present invention relates to a coating on a substrate. In particular, the present invention relates to a coating to be applied on building surfaces such as walls/facades, roofs, floors or furniture. The present invention in particular relates to a covering on the flooring in an outdoor area, in particular, a water park or the like.

The present invention is in particular concerned with a solution to the problem of lowering the heat of a surface, which surface may be walked over by bare feet. In a hot climate environment, sun radiation will heat the substrate, thus making it essentially impossible to walk over the substrate with bare feet. Furthermore, a heated structure of a building will likewise lead to an increased temperature in rooms within the building requiring excessive air conditioning to cool down the room to arrive at a convenient temperature. However, air conditioning requires energy consumption, which is disadvantageous.

BACKGROUND

US 2010/0104809 A1 relates to a roof covering providing a solar reflectance of at least 70% and a thermal emittance of at least 0.75. The known roof covering provides a protective coating on an upper surface of a substrate, which coating is a dried film of an aqueous composition comprising a water resistant styrene-acrylic emulsion polymer, at least one reflective pigment, flame retardant, and lightweight filler having a density of not more than 0.084 g/cm$^3$. At least partially embedded in the protective coating, there is provided a layer of particles to provide a solar reflectance of at least 70% and a thermal remittance of at least 0.75. The concept of the prior art coating on the substrate is to predominantly reflect the radiation energy and thus, avoid heating of the coating and the substrate.

In the prior art there are also known surface coatings which cooling effect is based on the concept of reducing the surface area making contact with a bare foot and thus, lowering the surface temperature that is felt by the person walking on the product with bare feet. Such coatings may reduce the temperature subjectively felt by the person walking on the surface during sun burning hours. However, these products do not really reduce the actual temperature on the surface of the coated substrate.

SUMMARY

It is an object of the present invention to provide an improved coating on a substrate, which coating is to reduce the temperature felt by a person walking on the substrate as well as the actual temperature on the surface.

In one aspect, the present invention provides a coating on a substrate comprising an impregnation material which is adhered on the substrate, a particulate material adhered on the impregnation material, and a top coat covering an upper surface of the coating, wherein the particulate material consists of crushed acrylic paint.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION

Figure 1:
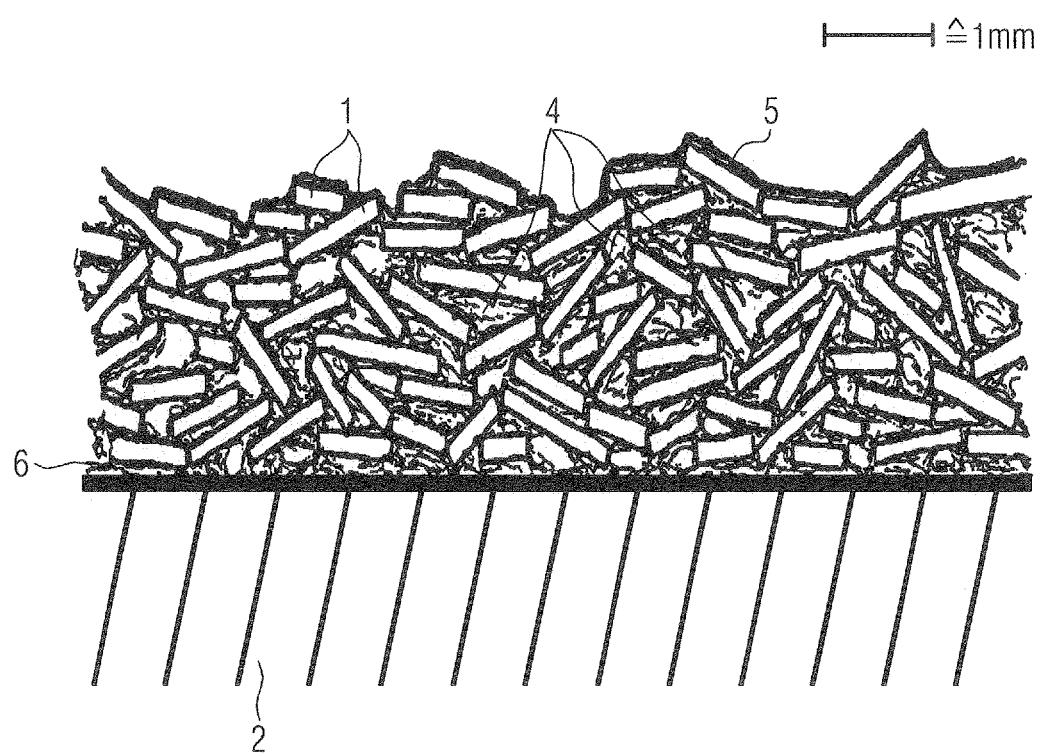
FIG. 1 is an illustrative representative sectional view of a coating according to the present invention provided on a substrate.

As substrate, any known substrates may be used. Examples of such substrates include, but are not limited to, building surfaces such as walls/facades, roofs, floors or furniture. Examples of substrate materials (that the substrate may include) include, but are not limited to, wood, metal, ceramic (including silica glass), concrete, stone (such as natural stone), and combinations of two or more thereof.

In any known substrate surface, the impregnation material may be adhered in a first step, such that it may be at least not fully cured. Thereafter, the particulate material is applied on the substrate, which is covered with the impregnation material layer and adhered thereon. As the impregnation material is liquid or at least not fully cured or hardened, the particulate material can be at least partially embedded therein and can be attached thereto. These particles of the particulate material may serve as heat transfer means to transfer heat from the top surface of the coating to the substrate and, additionally, may provide a certain roughness of the top surface of the coating, which leads to a reduced contact surface for the skin of a person who touches the top surface. Therefore, a reduced felt temperature and a reduced measured temperature are observed on the surface of the coating. It has been observed for the first time that said effect may be obtained by the use of ordinary acrylic paint that is crushed it after it is hardened. These crushed particles may be adhered to the impregnation material. With some aspects, the crushed acrylic paint is a recycled acrylic paint. Therefore, the particles used are very environmentally friendly.

According to a further aspect, the particulate material may be adhered on the impregnation material, after application of the impregnation material is applied onto the substrate in a liquid or semi-cured state. Such a constitution provides a close contact so that at least a lower portion of the particulate material sinks into the impregnation material. It may be that at least some particles of the particulate material show surfaces that protrude from the impregnation material. Protruding particles are then covered by the top coat.

According to a further aspect, voids may be provided between the particulate material particles, wherein a volume of voids not filled with the impregnation material is between 35 vol %. and 45 vol %. During the application of the particulate material to the impregnation material, the impregnation material may diffuse in voids between the particulate material particles. However, due to the structure of the material, some voids are not filled with impregnation material and may be filled with surrounding atmosphere. These empty voids show isolation properties, which, in combination with lowering the contact area between the coating and the skin of a person contacting the coating and a better heat transfer between the top surface of the coating and the substrate, further improves the chilling effect. Voids are in particular free spaces between the particulate material particles within the layer comprising the particulate material particles, which voids are empty, i.e. not filled with impregnation material and/or the material forming the top coat. Further possible volume amounts of voids not filled with the impregnation material are 20 vol %, 30 vol %, 20 vol %, and 50 vol %. Each of these recited values may independently serve as an upper or lower limit, depending on the required surface properties.

According to a further aspect, the particulate material may be adhered to the impregnation material to constitute an impregnation material layer and a particulate material layer with interdigitating interfaces. As the particulate material is adhered to the impregnation material, when it is at least in a semi-cured or semi-hardened state, a basically two-layered structure is provided, wherein at an interface, the impregnation material diffuses between the voids of the particles. This leads to interdigitating surfaces and an intimate contact constituting of one layer having two sub-layers of an impregnation material and a particulate material. These interdigitating surfaces lead to a high wear resistance and durability of the coating.

According to a further aspect, the coating may comprise at least two subsequent layers of impregnation material to which the particulate material is adhered. The cooling effect can be improved when more than one of the layers comprising impregnation material and particulate material are provided in subsequent layers. On top of these layers, the top coat is adhered.

According to a further aspect, the second layer may be applied after the first layer is cured/hardened or semi-cured/hardened. To obtain the two-layer structure of two layers of the impregnation material, to which particulate material is adhered, it is beneficial to first prepare the lower layer in the aforementioned way, namely, first the impregnation material is adhered to the substrate and the particulate material is adhered thereto. Thereafter, after said layer is finished as the impregnation material is at least semi-cured or fully cured, a second layer is applied in the same way, by first applying impregnation material and second applying the particulate material thereto.

According to a further aspect, the particulate material in the first and second layer may be composed of the same particulate material. The particulate material may be any crushed acrylic paint having a composition that is typical for acrylic paint.

According to a further aspect, the impregnation material in the first and second layer may be composed of the same material. For a simpler constitution, as impregnation material for the first and second layer, the same material may be used. An impregnation material may be any material that can be applied in a liquid state and is dried, cured or hardened at least after the particulate material is adhered thereto. In particular, impregnation materials for concrete floors, which are well known in the prior art, may be used. An example of such an impregnation material is described in DE 19828714 A1, which is incorporated herewith by reference. The impregnation material may be any base material or glue material, in particular a two-component material, with low viscosity, e.g. an epoxy resin based two component material may be used as impregnation material.

According to a further aspect, the top coat may be a water-based UV-stable two-component polyurethane coat. However, any coat can be used as a top coat that covers the protruding particles and may provide a high wear resistance.

According to a further aspect, the crushed acrylic paint may comprise an acrylic-based binder being mixed with a UV-stable pigment and at least one filler. As a pigment, colored and/or reflective pigments may be used. In particular, UV resistant pigments may be used, either artificial ones or nature based ones. If light pastel coloured pigments are used, the chilling effect may be enhanced. As the filler, glass, quartz, nature stone meal, calcium carbonate or barium sulphate may be used. As the binder for material constituting the particles alternative to the acrylic material (acrylic resin), epoxy resin, polyurethane or the like may be used. In this case, the particulate material may be any material having the aforementioned filler, pigment and binder. A particulate material from any known paint may be used.

According to a further aspect, the particulate material of the particle layer may be a platelet-shaped particulate material. When a platelet-shaped material is provided, this platelet shape serves as a cooling rib, when it is adhered to the impregnation material. Thereby, stacked regions are constituted, whereby the particle plates are stacked such that respective front and rear surfaces of such plates are in close contact with each other, whereby the respective contact surface has a tilted configuration with respect to the plane constituted by the coating. This allows good heat transfer and thereby, the functionality of direct heat from the surface of the coating to the substrate can be improved.

According to a further aspect, the platelets of the platelet-shaped particulate material may have an angular or very-angular shape. The platelet-shaped particulate material may be evaluated in view of sphericity and roundness according to the method of Krumbein and Sloss. Applying said method, the particles are visually inspected and the angularity, respectively roundness, is assigned to different values between 0 and 1. A roundness of 1 means a very low angularity (i.e., particles are round) while a roundness of 0 means the particles are very angular.

The angularity may also be derived by an automatic method, wherein the radius of all edges of a respective particle is determined and the mean radius of all edges is divided by the biggest (largest) radius of the inner cycle of the particle. The more edges the particles have, the more the effect of the felt temperature reduction can be improved. As the surface roughness is increased, the contact surface between the coating and the person contacting the coating is reduced.

According to a further aspect, the platelet-shaped particulate material may have a mean grain size of between 0.1 to 1 mm. Further possible mean grain sizes include, but are not limited to, 0.2 mm, 0.3 mm, 0.4 mm, 0.5 mm, 0.6 mm, 0.7 mm, 0.8 mm, and 0.9 mm. Each of these recited values may independently serve as an upper or lower limit, depending on the required coating properties.

According to a further aspect, 20 to 40% by weight, in particular one of the following ranges 10 to 50% by weight, 25 to 40% by weight of the entire particulate material contained falls within a sieve fraction of between 0.25 to 0.5 mm and 25 to 40% by weight, in particular 10 to 50% by weight of the entire particulate material may fall within a sieve fraction of between 0.5 and 1 mm. With some aspects, 5 to 20% by weight of the entire particulate material contained may fall within a sieve fraction of between 1.00 to 1.25 mm.

According to a further aspect, not more than 3% by weight of the entire particular material may fall within a sieve fraction of 0.125 mm or smaller, and in particular not more than 1% by weight.

According to a further aspect, not more than 1% by weight of the entire particular material may fall within a sieve fraction of 1.25 mm or larger, and in particular not more than 0.5% by weight.

The particulate material may not be constituted of particles all having the same size. The aforementioned particle size distributions are also possible. The aforementioned size distribution may be easily produced by crushing the acrylic paint.

According to a further aspect, the impregnation material for the second layer may be provided on the surface of the first layer with a specific weight of between 170 g/m$^2$ to 230 g/m$^2$. Also, the impregnation material constituting the base layer, which is in direct contact with the substrate, may be applied in the aforementioned amount. In this case, the substrate surface may be almost poreless. If a porous substrate material is used, the amount may be about 700 g/m$^2$, or more. When a porous substrate is coated, the pores need to be filled with the impregnation material and a remainder shall stay on the surface to allow the particulate material to adhere thereon.

According to a further aspect, the upper surface defined by the top coat may have a roughness value of between 0.5 mm and 3 mm. Further possible roughness values include, but are not limited to, 1 mm, 2 mm, and 2.5 mm. Each of these recited roughness values may independently serve as an upper or lower limit, depending on the required coating properties.

According to a further aspect, the particulate material may have thermal conductivity of between 0.5 and 3.0 W/(m K). Further possible thermal conductivities include, but are not limited to, 0.2 W/(m K), 0.8 W/(m K), 1.5 W/(m K), 2.0 W/(m K), and 2.5 W/(m K). Each of these recited thermal conductivity values may independently serve as upper or lower limit, depending on the required coating properties.

According to a further independent aspect, the present invention also provides a coating on a substrate comprising an impregnation material which is adhered on the substrate; a particulate material adhered on the impregnation material; and a top coat covering an upper surface of the coating; wherein the particulate material is a platelet-shaped particulate material.

According to this aspect of the invention, if the particulate material is a platelet-shaped material, an improved heat transfer from the top surface to the substrate may be provided. This platelet-shaped material is not delimited to a material based on an acrylic paint or any paint defined in the previous section. However, when such a platelet shape is used, this platelet-shaped particle serves as a cooling rib as described in the foregoing section.

According to a further aspect, the platelets of the platelet-shaped particulate material may have an angular or very-angular shape. The effect thereof and further aspects are described in the previous section, where the coating having the paint based particles is explained.

According to a further aspect, the platelet-shaped particulate material may have a mean grain size of between 0.1 to 1 mm. The effect thereof and further aspects are described in the previous section, where the coating having the paint based particles is explained.

According to a further aspect, 20 to 40% by weight, in particular 10 to 50% by weight of the entire particulate material contained may fall within a sieve fraction of between 0.25 to 0.5 mm and 25 to 40% by weight, in particular 10 to 50% by weight of the entire particulate material may fall within a sieve fraction of between 0.5 and 1 mm.

According to a further aspect, not more than 3% by weight of the entire particular material may fall within a sieve fraction of 0.125 mm or smaller, in particular not more than 1% by weight.

According to a further aspect, not more than 1% by weight of the entire particular material may fall within a sieve fraction of 1.25 mm or larger, in particular not more than 0.5% by weight.

The particulate material may not be constituted of particles all having the same size. The aforementioned particle size distributions are also possible. The aforementioned size distribution may be easily produced by crushing the acrylic paint. Further effects thereof are described in the previous section, where the coating having the paint based particles is explained.

According to a further aspect, the impregnation material for the second layer may be provided on the surface of the first layer with a specific weight of between 170 g/m$^2$ to 230 g/m$^2$. Also, the impregnation material constituting the base layer, which is in direct contact with the substrate, may be applied in the aforementioned amount. In this case, the substrate surface may be almost poreless. If a porous substrate material is used, the amount may be about 700 g/m$^2$, or more. When a porous substrate is coated, the pores need to be filled with the impregnation material and a remainder shall stay on the surface to allow the particulate material to adhere thereon.

According to a further aspect, the upper surface defined by the top coat may have a roughness value of between 0.5 mm and 3 mm. Further possible roughness values include, but are not limited to, 1 mm, 2 mm, and 2.5 mm. Each of these recited roughness values may independently serve as an upper or lower limit, depending on the required coating properties.

According to a further aspect, the particulate material may have thermal conductivity of between 0.5 and 3.0 W/(m K). Further possible thermal conductivities include, but are not limited to, 0.2 W/(m K), 0.8 W/(m K), 1.5 W/(m K), 2.0 W/(m K), and 2.5 W/(m K). Each of these recited thermal conductivity values may independently serve as an upper or lower limit, depending on the required coating properties.

According to a further aspect, the particulate material may be adhered to the impregnation material to constitute an impregnation material layer and a particulate material layer with interdigitating interfaces.

According to a further aspect, the coating may comprise at least two subsequent layers impregnation material to which the particulate material is adhered.

According to a further aspect, the second layer is applied after the first layer may be cured or semi-cured.

According to a further independent aspect, the present invention also provides a coating on a substrate comprising: a base material that is adhered on the substrate; and a particulate material adhered on the base material; wherein the particulate material has an angular or very-angular shape such that the upper surface of the coating has a roughness of between 0.5 mm and 3 mm. According to this aspect of the invention, a base material is used, which is adhered on the substrate and thereto, particles having angular or very angular shape are adhered such that the upper surface of the coating has a roughness of between 0.5 mm and 3 mm.

With the shape of the particulate material, the surface roughness can be adjusted and, thus, the contact surface between the person and the coating can be reduced. Further effects thereof are described in the previous section, where the coating having the paint based particles is explained. For example, an angular/very angular material improved the roughness of the surface. Thus, the surface area of the coating, which may be in contact with the skin (bare foot) of a person walking on this coating, is reduced. In particular, it is preferable that the contact surfaces, that means, the ratio of the surface of the coating that is actually in contact with the person is between 2 and 6%, preferably between 3 and 4% for walking with bare feet and respectively between 1 and 3%, preferably 1.5 and 2% when walking with shoes having a stiff sole.

This low contact surface ratio additionally reduces the subjective felt temperature.

This is due to the fact that the heat transfer coefficient between bare feet/skin and the surrounding air is lower than the respective coefficient between the bare feet/skin and the solid raw material or respective the coating substrate. As the contact area is reduced, the subjective felt temperature is decreased.

As base material, any material having an adhering effect and a respective surface tension such that it may be coated on the substrate may be used. Examples are glue, impregnation material, primer and the like. Preferably, this base material is applied in a liquid state and then semi-hardened or semi-cured, before the particulate material is adhered.

According to a further aspect, the coating may further comprise a top coat covering an upper surface of the coating.

According to a further aspect, the coating may comprise at least two subsequent layers impregnation material to which the particulate material is adhered.

According to a further aspect, the second layer is applied after the first layer is cured or semi-cured.

According to a further aspect, the present invention also proposes a method for coating different surfaces, in particular a method for coating building surfaces such as walls/facades, roofs, floors or furniture. The described product related features may thus also be provided as method related features in the respective inventive method.

Additionally the present invention proposes the use of the inventive coating on the aforementioned substrates.

The present invention also relates to the respectively coated surfaces, in particular of a building.

Further advantages of the invention shall be explained with reference to the Figures and the examples described below.

A schematic example of the inventive coating on a substrate is schematically shown in FIG. 1. A particulate material, which is in the present case a platelet material, is denoted with reference character 1 in FIG. 1. After applying in a first step an impregnation material 3 to the substrate 2 (such as to surface 6 of substrate 2), the platelet material 1 is applied to the semi-cured impregnation material 3. As the impregnation material 3 is semi-cured, this material flows at least partially in between voids 4 between the platelet material and at least partially fills some of these voids 4.

On top of this coating comprising the platelet material 1 and the impregnation material, a top coat 5 of a sealing resin is provided. This top coat 5 covers the protruding edges of the platelet material 1 and leads to an enhanced wear resistance and durability.

In the following, different possible materials, which are not intended to be limiting with regard to the present invention, are discussed.

Impregnation Layer Material:

The impregnation material used may be any material that can be applied in a liquid form and cures, hardens or dries after application thereof.

Such a material may be an impregnation material, which is commonly used for covering and impregnating concrete or floor materials.

A specific example may be a two-component epoxy resin.

After the two components are put together, the impregnation material may be applied to the substrate in an amount of 10 to 200 $g/m^2$. Further amounts are 50 $g/m^2$, 100 $g/m^2$, 150 $g/m^2$. In this case, the substrate surface may be almost poreless. If a porous substrate material is used, the amount may be about 700 $g/m^2$, or more. When a porous substrate is coated, the pores need to be filled with the impregnation material and a remainder shall stay on the surface to allow the particulate material to adhere thereon.

A specific impregnating material that may be used is described in DE 19828714 A1, the disclosure thereof being incorporated by this reference.

Particulate Material:

As particulate material, any material having a platelet appearance and/or any material that is crushed acrylic paint and/or any material that has an angular or very angular shape such that the upper surface of the coating has a roughness of between 0.5 mm and 3 mm may be used.

As long as a platelet material and/or any material having an angular or very angular shape is used, its shape may be determined in accordance with the following scheme.

Figure 2:
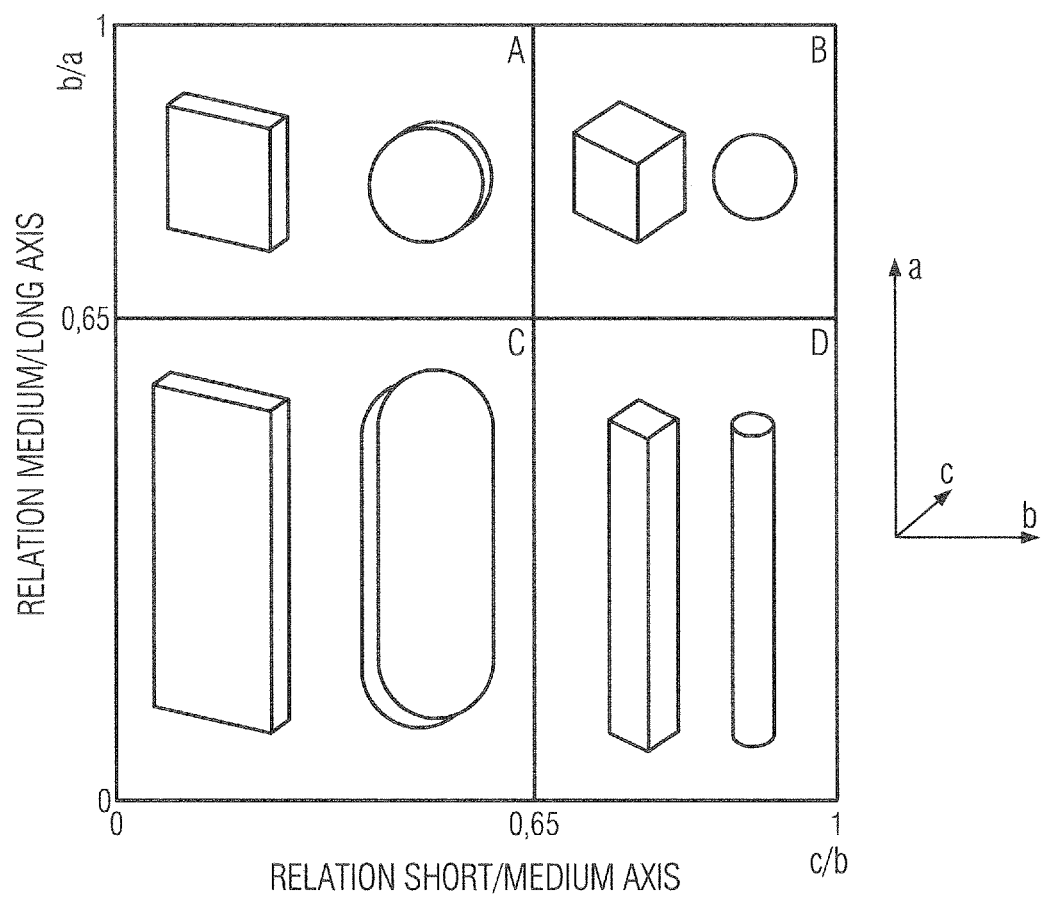
FIG. 2 is a representative illustration of a relation between the ratio of different axes of the particles of the particulate material and their appearance.

Any platelet-shaped material is an idealized form wherein one axis is the longest axis, one axis is a medium axis, and one axis is the shortest axis. This is representatively shown in FIG. 2. Each platelet material may have an envelope geometry in accordance with the examples of particles shown in FIG. 2. In FIG. 2, the axes a, b, c denote the respective short axis (c), the medium axis (b) and the long axis (a) of the particle. With the relation of the axis length, the platelet shape of the particles can be characterized. A ratio between the medium axis b to the short axis c of 1 (see right quadrant D in FIG. 2) means that those axes are equal. A relation of about 0 means that the shortest axis c is very short, and the medium axis b is bigger than the shortest axis c (see quadrant C). Therefore, in the horizontal axis in FIG. 2, a relation between the shortest and the medium axis is between 0 and 1.

A further relation may be established between the medium axis b and the longest axis a, which is shown in the vertical axis. As the relation between the longest to the medium axis c to the medium axis b is equal, this ratio is about 1 (see quadrant A).

The platelet material is preferably a material, in which the ratio between the shortest and the medium axis c/b is between 0 and 0.65, and wherein the ratio between the medium and the longest axis b/a is between 0 and 1 (quadrants A and C). It is in particular preferred to also choose the relation of the medium to the longest axis b/a being between 0 and 0.65.

Further preferred ranges of the ratios between the shortest to the medium axes a to b are between 0.3 and 0.5.

This platelet appearance increases the surface-to-volume ratio. Also, it has been unexpectedly observed that the higher the surface to volume ratio, that means as more platelet-shaped the particles are, the better the heat can be transferred between these platelet particles, and via them, form the top surface of the coating to the substrate. When a platelet-shaped material is provided, this platelet shape serves as a cooling rib, when it is adhered to the impregnation material.

Thereby, stacked regions are constituted, whereby the particle plates are stacked such that respective front and rear surfaces of such plates are in close contact with each other, whereby the respective contact surface has a tilted configuration with respect to the plane constituted by the coating. This allows good heat transfer and thereby, the functionality of direct heat from the surface of the coating to the substrate can be improved.

Figure 3:
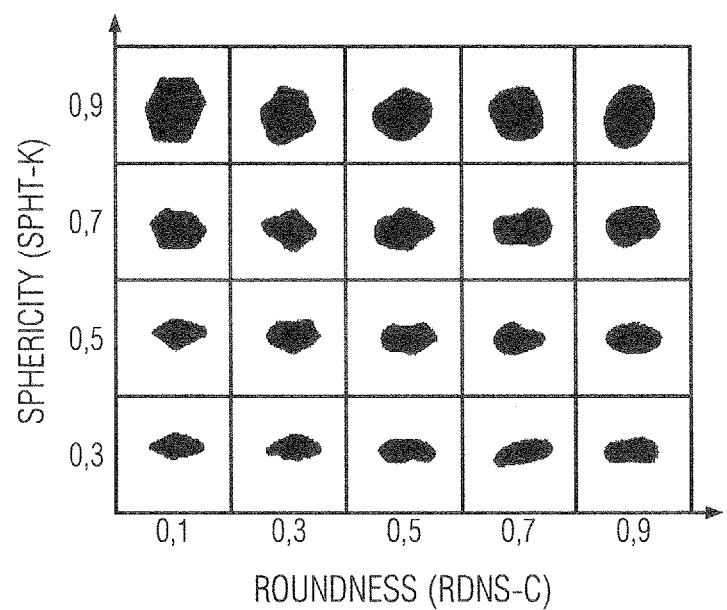
FIG. 3 is a representative illustration of a relation between the roundness (x axis) and the sphericity (y axis), in which the roundness is a measure of the angular shape of the particles of the particulate material.

A further measure concerning the morphology is the so-called angularity. This angularity may be evaluated by visual methods, e.g. in accordance with so-called Krumbein and Sloss method. A respective example illustrating said method is shown in FIG. 3.

At the horizontal axis, a scale between 0.0 and 1 is provided as a measure for the roundness (which is a measure for the angularity), while at the vertical axis, a scale between 0.0 and 1.0 is given for the so-called sphericity. The sphericity is a measurement indicating how spherical an object is.

Sphericity is a measurement indicating how spherical (round) an object is. As such, it is a specific example of a compactness measurement of a shape. The sphericity of a particle is defined by the following formula:

$$\Psi = \frac{\pi^{\frac{1}{3}}(6V_p)^{\frac{2}{3}}}{A_p}$$

In the above formula, $V_p$ is volume of the particle $A_p$ is the surface area of the particle. The sphericity of a sphere is by definition unity (1.00) and, by the isoperimetric inequality, any particle which is not a sphere will have sphericity less than 1.

The roundness is a measurement for angularity of the particles. According to the method of Krumbein and Sloss, each particle is visually inspected and assigned to a field in the matrix in FIG. 3. Therein, particles having a roundness between 0 and 0.2 (an angularity between 1 and 0.8) are specified as very angular, particles having a roundness between 0.2 and 0.4 (an angularity between 0.8 and 0.6) are specified as angular, particles having a roundness between 0.4 and 0.6 (an angularity between 0.6 and 0.4) are specified sub-angular, particles having a roundness between 0.6 and 0.8 (an angularity between 0.4 and 0.2) are specified as rounded, and particles having a roundness between 0.8 and 1.0 (an angularity between 0.2 and 0.0) are specified as good rounded.

It is preferred in the present case that the appearance of the platelet material be at least angular (roundness below 0.4). In particular, it is preferred that the roundness be very angular (roundness below 0.2).

The higher the angularity of this platelet material, the rougher the surface of the coating is, on the one hand. On the other hand, said angularity ensures a respective distance between adjacent particles such that respective voids are generated. Therefore, a not so compact structure is obtained. The not too compact open structure improves the heat transfer from the surface to the substrate, and additionally leads to a certain isolation of the material. The more edges the particles have, the more the effect of the felt temperature reduction can be improved. As the surface roughness is increased, the contact surface between the coating and the person contacting the coating is reduced.

Figure 4:
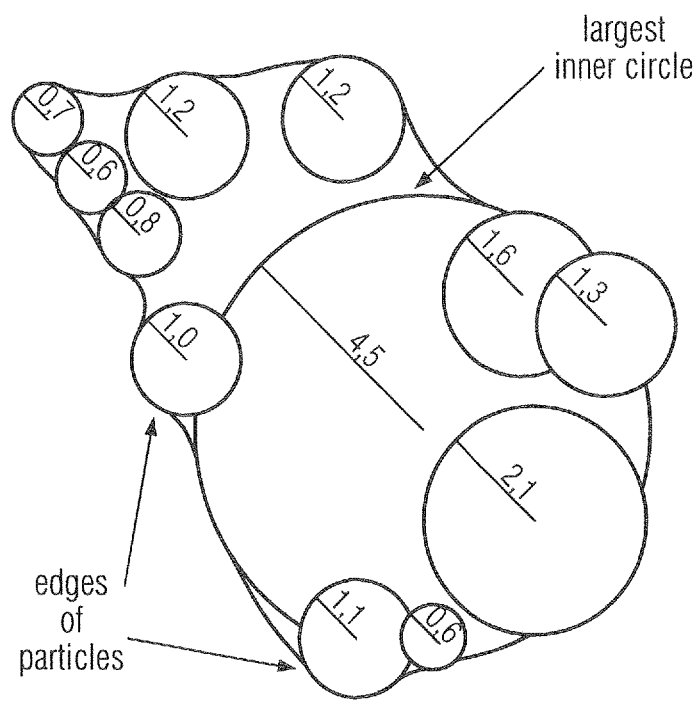
FIG. 4 is a representative illustration of a further method of measuring the angularity of the particles of the particulate material.

The angularity may also be derived by an automatic method as schematically shown in FIG. 4, wherein the radius of all edges of a respective particle is determined and the mean radius of all edges is divided by the biggest radius of the inner cycle of the particle.

As shown in FIG. 4, the radii of all edges of the particles, when viewed in a plane, are determined and the mean radius of all edges is determined. This mean radius is divided by the radius of the biggest (largest) inner circle within the particle. The obtained ratio is a measurement for the angularity. The higher the angularity, the lower the value (about 0) and the lower the angularity, the value is about 1. Very angular means a value of 0.0 to less than 0.2, and angular means a value of 0.2 to 0.4. The values derived from said methods are similar to the values derived by the method of Krumbein and Sloss.

The angular/very angular material improved the roughness of the surface, which may be coated with the top coat. Thus, the surface area of the coating, which may be in contact with the skin (bare foot) of a person walking on this coating, is reduced. In particular, it is preferable that the contact surfaces, that means, the ratio of the surface of the coating that is actually in contact with the person, is between 2 and 6%, preferably between 3 and 4% for walking with bare feet and respectively between 1 and 3%, preferably between 1.5 and 2%, when walking with shoes having a stiff sole. This low contact surface ratio additionally reduces the subjective felt temperature. This is due to the fact that the heat transfer coefficient between bare feet/skin and the surrounding air is lower than the respective coefficient between the bare feet/skin and the solid raw material. As the contact area is reduced, the subjective felt temperature is decreased.

Therefore, the combination of platelet appearance serving as cooling ribs improves the heat transfer from the top surface to the substrate, with the angular shape, having due to the small contact surface the effect of decreasing the felt temperature provides a temperature reducing coating.

The platelet materials have preferably a thickness of 50μ to 115 μm, further preferred thicknesses are 80, 100, 115, 120, 130 μm. The respective thicknesses may each constitute an upper or lower limit of a thickness. The respective thickness is to be taken in view of the heat conduction requirements.

The so-called apparent density of the particulate material (i.e., the mass of the material in relation to the volume including voids within the material) shall be preferably in the range between 2000 kg/m³ and 2800 kg/m³. Further preferred apparent density values are 2100, 2200, and 2400 kg/m³. The respective apparent density may each constitute an upper or lower limit.

The so-called outer density, which is the relation between the mass of the material and the volume after pouring the material on a surface should preferably in the range between 1000 and 2000 kg/m³, preferable values include, but are not limited to, 1100, 1200, 1300, 1400, 1500, 1600, 1700, and 1800 kg/m³. These recited outer density values may each independently represent an upper or lower limit.

The volume of the pores in the loose platelet material may be between 25 to 50 vol %, in particular between 35 and 45 vol %, or 40 vol %.

By the combination of one or all of the features, the particles may be adjusted to show the improved chilling effect as described above.

Additionally or alternatively to the platelet appearance, the particulate material may be made of an acrylic paint that is crushed. Any known acrylic paint, for example also recycled acrylic paint, may be used. Before crushing the acrylic paint, the acrylic paint should be hardened and thereafter undergo a crushing procedure. It is also preferred to apply the crushing procedure to a layer of acrylic resin or a foil.

The crushed acrylic paint may comprise an acrylic-based binder being mixed with a UV-stable pigment and at least one filler. As a pigment, coloured and/or reflective pigments may be used. In particular UV resistant pigments may be used, either artificial ones or nature based ones. As long as light pastel coloured pigments are used, the chilling effect may be enhanced. As a filler, glass, quartz, nature stone meal, calcium carbonate or barium sulphate may be used. As a binder for material constituting the particles alternative to the acrylic material (acrylic resin), epoxy resin, polyurethane or the like may be used. In this case, the particulate material may be any material having the aforementioned filler, pigment and binder. A particulate material from any known paint may be used.

Instead of any acrylic paint, a particulate material made from any known paint may be provided.

The particulate material may specifically have a certain particle size distribution as given in Table 1 below.

TABLE 1

| Particle size/sieve fraction (mm) | Amount (vol %) |
|---|---|
| 0.00-0.125 | 0-3% |
| 0.125-0.25 | 2-10% |
| 0.25-0.50 | 25-40% |
| 0.50-1.00 | 25-40% |
| 1.00-1.25 | 5-20% |
| >1.25 | <1% |

This means, about between 0 and 3 vol % fall within a sieve fraction of between 0.00 to 0.125 mm, between 2 and 10 vol % fall within a sieve fraction of 0.125 to 0.25, between 25 and 40 vol % fall within a sieve fraction of 2.25 to 0.50, and about 25 to 40 vol % fall within a sieve fraction between 0.5 to 1.0, 5 to 20 vol % fall within a sieve fraction of between 1.00 to 1.25 and below 1% fall within a sieve fraction bigger than 1.25 mm.

Top Coat:

After the particulate material is adhered on the impregnating material, a top coat may be provided.

The top coat provides a sealing layer and prevents in particular the particles from being peeled off. This sealing layer (i.e., the top coat) may be a pore filling top coat filling the pores of the particulate material at least partially, a low viscosity two component resin, a transparent coating, and a waterproof material. This coat may be a two-component polyurethane based top coating. In particular, it is preferred that the top coat be a different material than the impregnation layer. Due to the top coat, a closed surface is provided, which is easy to clean, has anti slippery abilities, and is wear resistant and durable.

Production Method:

The coating of the substrate with the inventive material is described as follows.

After the impregnation material is applied to the substrate surface, for example, with an inking roller, the particulate material is applied thereto. To allow the particulate material to adhere, the impregnation layer may be semi-cured, semi-hardened or semi-dried, or the particulate material may be applied directly after application of the impregnation layer is applied and is still liquid.

The film thickness of the wet film of the impregnation layer is, for example, 100 g/m²+/−50 g/m². If porous material, such as porous concrete, is used as a substrate, the film thickness of the wet film of the impregnation layer is, for example, 700 g/m². This impregnation layer is applied with an inking roll as a continuous layer.

The particulate materials may be blown on the impregnation layer, e.g. by a high pressure pistol.

If the impregnation layer is not yet hard after the application onto the substrate, the particulate material may sink into the impregnation material and the impregnation material may be diffused between the particulate material, also by capillary forces. Thus, there may be provided voids (space) between the particulate material particles, wherein a volume of voids not filled with the impregnation material is between 35 vol %. and 45 vol %. During the application of the particulate material to the impregnation material, the impregnation material may diffuse in voids between the particulate material particles. However, due to the structure of the material, some voids are not filled with impregnation material and may be filled with surrounding atmosphere. These empty voids show isolation properties, which, in combination with lowering the contact area between the coating and the skin of a person contacting the coating and a better heat transfer between the top surface of the coating and the substrate, further improves the chilling effect. Further possible volume amounts of voids not filled with the impregnation material include, but are not limited to, 20 vol %, 30 vol %, 40 vol %, and 50 vol %. Each of these recited values may independently serve as an upper or lower limit, depending on the required surface properties.

When there are voids that are not filled with impregnation material, for example, such that air is contained in the voids, a thermal isolation is improved and, thus, the cooling performance further enhanced.

After the particulate material is adhered to the impregnation material, the produced layer is harder. Thereafter the excessive particulate material, which is not adhered, are blown away.

Thereafter, the top coat may be applied with an ink roll. Respective film thicknesses may be the same as the film thicknesses mentioned above for the impregnation material.

Alternatively, after the hardening of the first layer, in a further step, a second impregnation layer may by applied by an ink roll. Thereafter in a further step, the particulate materials may be applied to the not yet hardened impregnation material of the second layer.

Thereafter, on top of such a two-layered structure, the respective top coat may be provided.

More than these two layers may also be provided comprising an impregnation material in combination with particulate materials.

Substrate Material:

The substrate material may be any known substrate material such as, but not limited to, wood, metal, ceramic (including silica glass), concrete, stone (such as natural stone), and combinations of two or more thereof. The substrate may be, for example, a terrace floor, a roof and/or the wall of a building, which in each case may independently include one or more substrate materials.

The present invention is more particularly described in the following examples, which are intended as illustrative only, since numerous modifications and variations therein will be apparent to those skilled in the art.

EXAMPLES

In Table 2 below, a comparative experiment of a coated concrete floor in comparison with a respective uncoated concrete floor is provided.

TABLE 2

| Surface | Temperature measurement (at 1 p.m.) |
| --- | --- |
| Concrete surface RAL 1011 brown beige | about 80° C. (surface temperature) |
| Coating surface of the coating with particulate platelet material embedded in an impregnation layer RAL 1011 brown beige | about 45° C. (surface temperature) about 38° C. (subjective felt temperature) |

These experiments were done on Jun. 10, 2015 at 1 pm in Dubai.

The coating according to the present invention of Table 2 was composed of: an impregnation/primer layer formed from PORFIL.PLUS X pore-filling coating; and thereover a topcoat layer formed from PLEYERS.WB 800 GLOSS two-component polyurethane topcoat, both commercially available from Porviva GmbH.

The concrete surface having a brown-beige color (RAL 1011) had an 80° C. surface temperature, while the surface with the inventive coating had a measured surface temperature of 45° C. The subjective felt temperature by a person with bare feet was 38° C.

This is believed to be due to the fact of the angular edges of the different particles.

Technical Effect:

The combination of the particulate material particles made of a crushed acrylic paint and/or the angular shaped material and/or the platelet material that is/are embedded in the impregnation layer provides two functions. One function is to transfer the heat via the particulate material to the substrate, the other is to reduce the felt temperature due to the low contact surface ratio. Air filled voids, which may be provided, provide a further isolating effect.

The inventors unexpectedly found that any of the aforementioned features alone or in combination provide an improved coating on a substrate, which coating is to reduce the temperature felt by a person walking on the substrate as well as the actual temperature on the surface.

Each of the aspects of the examples may be combined with each other. An impregnation layer can be provided by any base material and therefore, the definition of impregnation is not limiting.

The present invention has been described with reference to specific details of particular embodiments thereof. It is not intended that such details be regarded as limitations upon the scope of the invention except insofar as to the extent that they are included in the accompanying claims.

What is claimed is:

1. A coating on a substrate comprising:
    an impregnation material that is adhered on the substrate, wherein the impregnation material is made of a two component material having before curing a viscosity of smaller than 40 mPa*s;
    a particulate material adhered on the impregnation material, wherein the particulate material consists of crushed acrylic paint and is adhered on the impregnation material, when the impregnation material is in a liquid or semi-cured state after application onto the substrate; and
    a top coat covering an upper surface of the coating;
    wherein voids are provided between the particulate material particles, and wherein a volume of voids not filled with the impregnation material is between 35 vol %. and 45 vol %.

2. The coating of claim 1, wherein the two component material is an epoxy resin based two component material.

3. The coating of claim 1, wherein the particulate material is adhered to the impregnation material to constitute an impregnation material layer and a particulate material layer with interdigitating interfaces.

4. The coating of claim 1, comprising at least two subsequent layers of impregnation material to which the particulate material is adhered, wherein the at least two subsequent layers define a first layer and a second layer which is provided on the surface of the first layer.

5. The coating of claim 4, wherein the second layer is applied after the first layer is cured or semi-cured.

6. The coating of claim 4, wherein the particulate material in the first and second layer is composed of the same particulate material.

7. The coating of claim 4, wherein the impregnation material in the first and second layer is composed of the same material.

8. The coating of claim 1, wherein the top coat is a water-based UV-stable two-component polyurethane coat.

9. The coating of claim 1, wherein the crushed acrylic paint comprises an acrylic-based binder being mixed with a UV-stable pigment and at least one filler.

10. The coating of claim 1, wherein the particulate material of the particle layer is a platelet-shaped particulate material.

11. The coating of claim 10, wherein the platelets of the platelet-shaped particulate material have an angular or very-angular shape.

12. The coating of claim 11, wherein the platelet-shaped particulate material has a mean grain size of between 0.1 to 1 mm.

13. The coating of claim 1, wherein 20 to 40% by weight of the entire particulate material contained falls within a sieve fraction of between 0.25 to 0.5 mm and wherein 25 to 40% by weight of the entire particulate material falls within a sieve fraction of between 0.5 and 1 mm.

14. The coating of claim 1, wherein not more than 3% by weight of the entire particular material falls within a sieve fraction 0.125 mm or smaller.

15. The coating of claim 1, wherein not more than 1% by weight of the entire particulate material falls within a sieve fraction of 1.25 mm or larger.

16. The coating of claim 4, wherein the impregnation material for the second layer is provided on the surface of the first layer with a specific weight of between 170 g/m$^2$ to 230 g/m$^2$.

17. The coating of claim 11, wherein the upper surface defined by the top coat has a roughness of between 0.5 mm and 3 mm.

18. The coating of claim 1, wherein the particulate material has thermal conductivity of between 0.5 and 3.0 W/(m K).

19. A coating on a substrate comprising:
    an impregnation material that is adhered on the substrate;
    a particulate material adhered on the first impregnation material; and
    a top coat covering an upper surface of the coating;
    wherein the particulate material is a platelet-shaped particulate material, wherein the impregnation material is made of an epoxy resin based two component material, wherein the particulate material is adhered on the impregnation material, when the impregnation material is in a liquid or semi-cured state after application onto the substrate, wherein voids are provided between the particulate material particles, wherein a volume of voids not filled with the impregnation material is between 35 vol %. and 45 vol %.

20. The coating of claim 19, wherein the platelets of the platelet-shaped particulate material have an angular or very-angular shape.

21. The coating of claim 19, wherein the platelet-shaped particulate material has a mean grain size of between 0.1 to 1 mm.

22. The coating of claim 19, wherein 20 to 40% by weight of the entire particulate material contained falls within a sieve fraction of between 0.25 to 0.5 mm and wherein 25 to 40% by weight of the entire particulate material falls within a sieve fraction of between 0.5 and 1 mm.

23. The coating of claim 19, wherein not more than 3% by weight of the entire particular material falls within a sieve fraction of 0.1 to 5 mm or smaller.

24. The coating of claim 19, wherein not more than 1% by weight of the entire particular material falls within a sieve fraction of 1.25 mm or larger.

25. The coating of claim 19, comprising at least two subsequent layers of impregnation material to which the particulate material is adhered, wherein the at least two subsequent layers define a first layer and a second layer which is provided on the surface of the first layer, and wherein the impregnation material for the second layer is provided on the surface of the first layer with a specific weight of between 170 g/m$^2$ to 230 g/m$^2$.

26. The coating of claim 19, wherein the upper surface defined by the top coat has a roughness of between 1 mm and 3 mm.

27. The coating of claim 19, wherein the particulate material has thermal conductivity of between 0.5 and 3.0 W/(m K).

28. The coating of claim 19, wherein the particulate material is adhered to the impregnation material to constitute an impregnation material layer and a particulate material layer with interdigitating interfaces.

29. The coating of claim 19, comprising at least two subsequent layers of impregnation material to which the particulate material is adhered.

30. The coating of claim 29, wherein the second layer is applied after the first layer is cured or semi-cured.

31. A coating on a substrate comprising:
a base material that is adhered on the substrate; and
a particulate material adhered on the base material;
wherein the particulate material has an angular or very-angular shape such that the upper surface of the coating has a roughness of between 0.5 mm and 3 mm,
wherein the impregnation material is made of a two component material having an viscosity of smaller than 40 mPa*s, wherein the particulate material is adhered on the impregnation material, when the impregnation material is in a liquid or semi-cured state after application onto the substrate.

32. The coating of claim 31, further comprising a top coat covering an upper surface of the coating.

33. The coating of claim 31, comprising at least two subsequent layers of impregnation material to which the particulate material is adhered.

34. The coating of claim 32, wherein voids are provided between the particulate material particles, wherein a volume of voids not filled with the impregnation material is between 35 vol %. and 45 vol %.

* * * * *